May 21, 1940.　　　K. J. KOLLMANN　　　2,201,733
BORING MACHINE
Filed Feb. 17, 1936　　　4 Sheets-Sheet 2
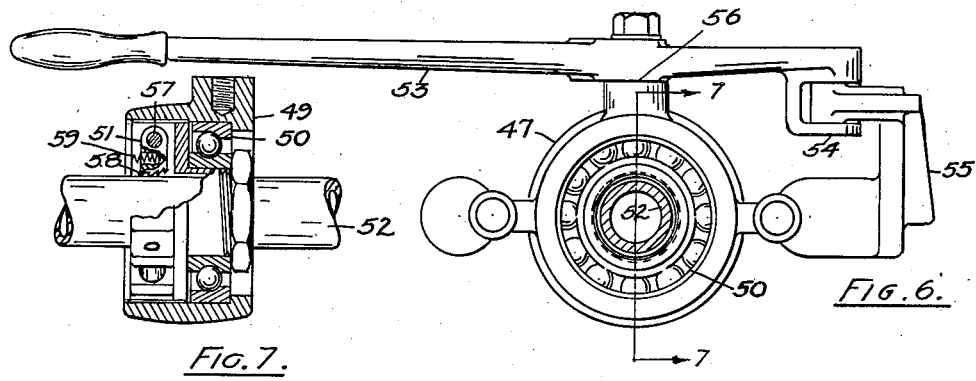
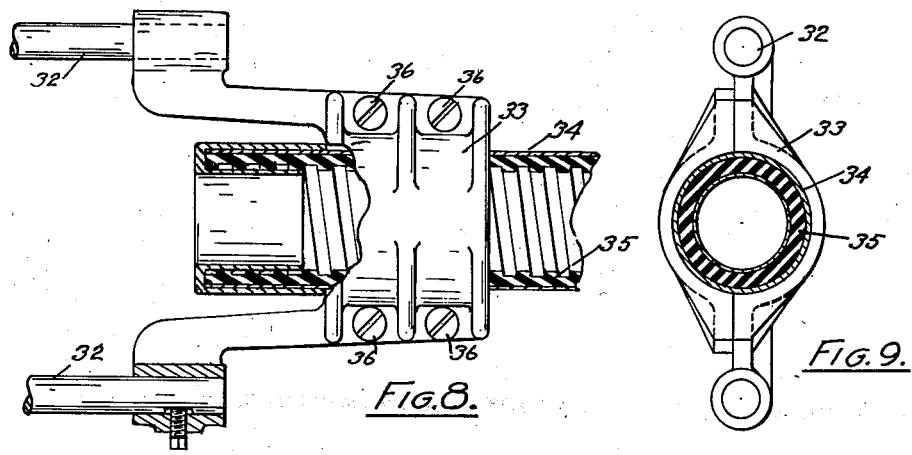
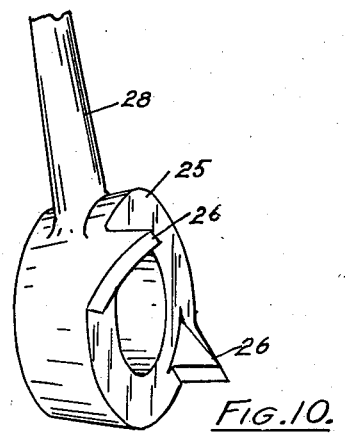
INVENTOR.
Karl J. Kollmann
BY
Florian G. Miller
ATTORNEY.

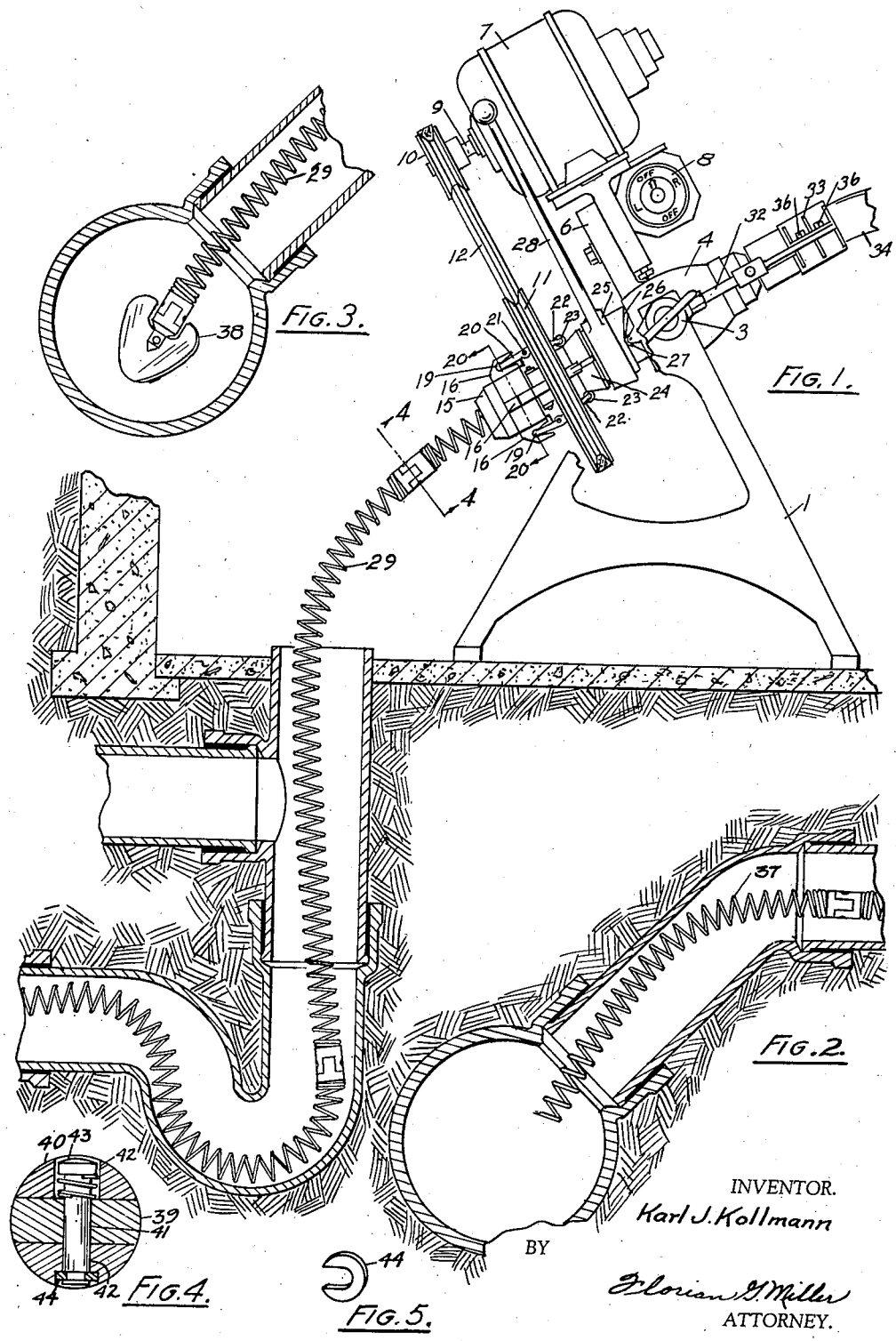

May 21, 1940.  K. J. KOLLMANN  2,201,733
BORING MACHINE
Filed Feb. 17, 1936    4 Sheets-Sheet 3
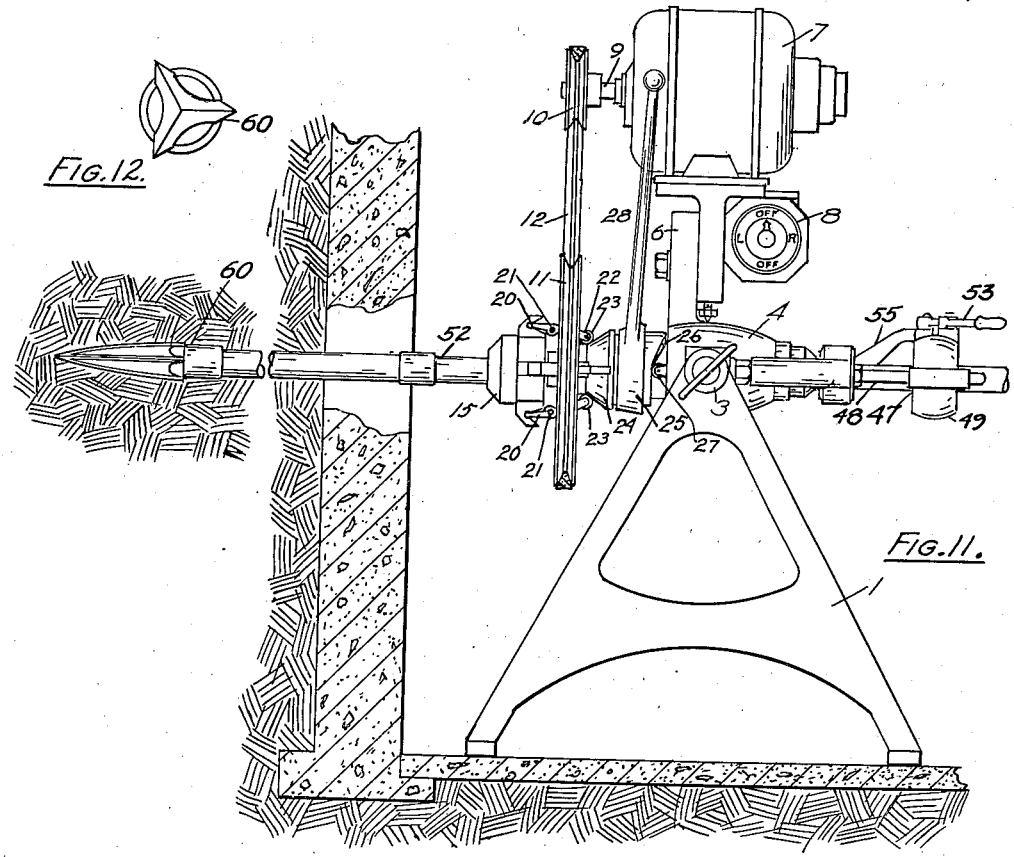
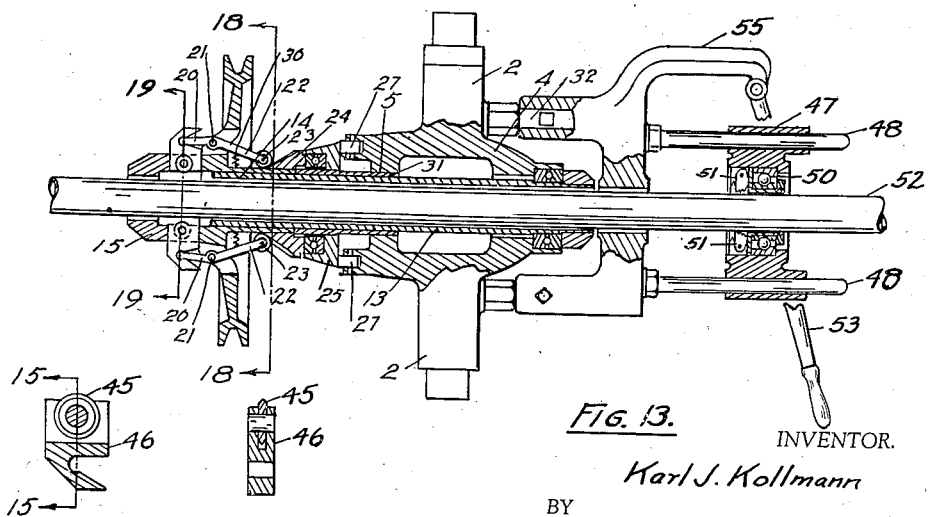
INVENTOR.
Karl J. Kollmann
BY
Florian G. Miller
ATTORNEY.

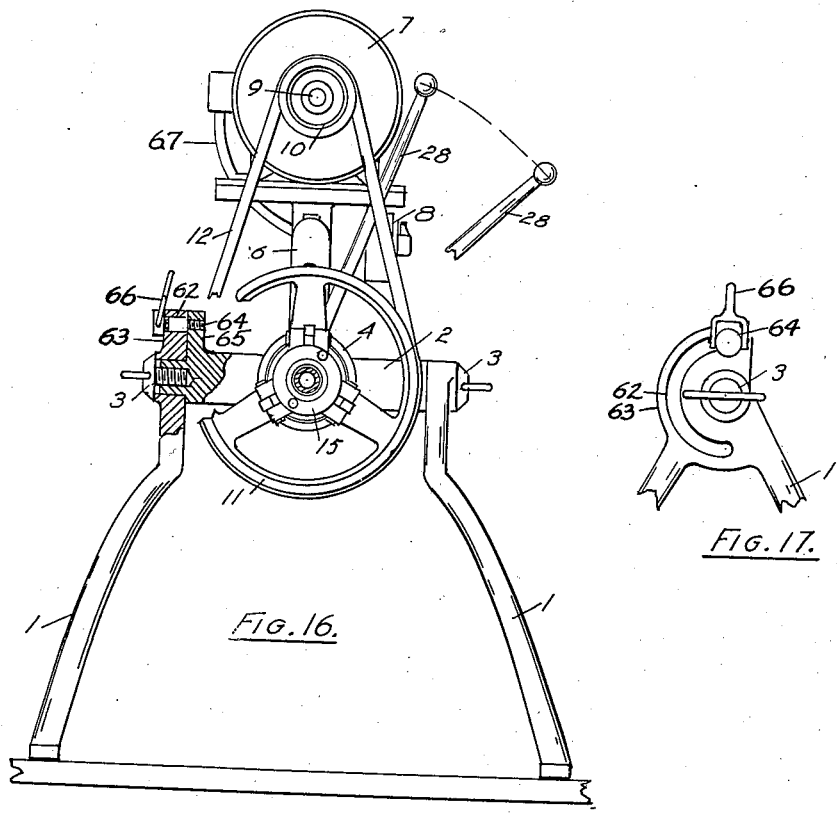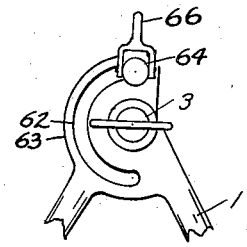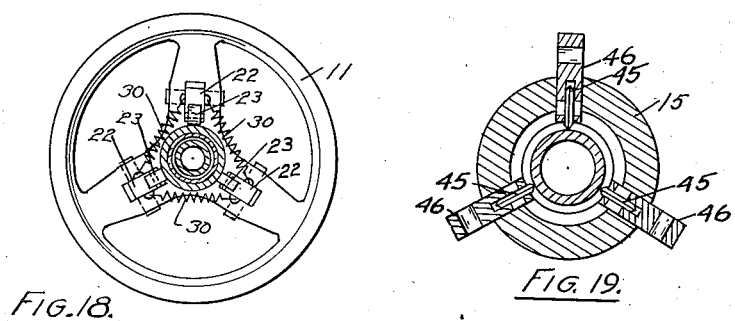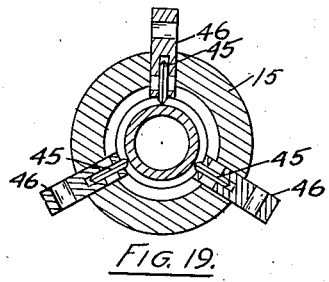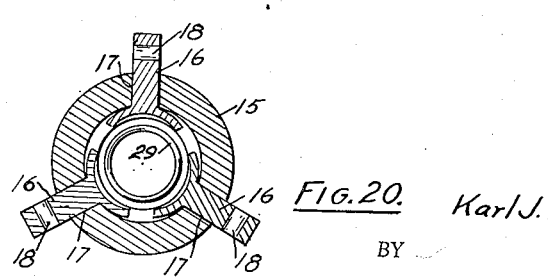

Patented May 21, 1940

2,201,733

UNITED STATES PATENT OFFICE 2,201,733

BORING MACHINE

Karl J. Kollmann, Erie, Pa.

Application February 17, 1936, Serial No. 64,306

2 Claims. (Cl. 15—104.30)

This invention relates generally to boring machines, and more particularly to machines for cleaning and clearing clogged pipe lines and for boring pipe holes.

All devices of this character made according to the prior art, and with which I am familiar, have had no means to progressively feed a flexible boring device or a solid boring rod such as a pipe boring rod as well as rotate it during the process. No machine has been provided which has the capacity to function as a boring machine for boring pipe holes for pipe lines and also as a machine for clearing and cleaning pipes and sewer lines. Pipe lines have been driven into the ground by hand heretofore requiring much time and labor. This machine performs the same function more efficiently and in a much quicker time. All prior devices have been very inefficient and unpractical when required to clear and clean sewers which have many bends and turns.

It is, accordingly, the principal object of my invention to provide a machine which may be utilized to clear and clean pipe lines as well as any other function which requires a rotating progressively feeding bore to penetrate material.

Another object of my invention is to provide a boring machine which is simple in construction, economical in cost, easy to operate, and efficient in operation.

Another object of my invention is to provide a boring machine for clearing and cleaning clogged pipe lines of any shape or contour.

Another object of my invention is to provide a boring machine for progressively feeding and laying a pipe line and at the same time bore its own hole.

Another object of my invention is to provide a boring machine which rotates flexible boring rods, pipes, open helically wound rods, or any circular device and also progressively feeds the rotating boring member at the same time.

Another object of my invention is to provide a boring machine which will function in limited space.

Another object of my invention is to provide boring rods of novel design in connection with my machine.

Other objects of my invention will become evident from the following detailed description, taken in conjunction with the accompanying drawings, in which Fig. 1 is a side elevational view of my novel boring machine in a tilted position and with the flexible boring rod passing through a sewer pipe.

Fig. 2 is a side elevational view of a sewer pipe in cross-section showing my flexible boring rod following the forty-five degree bend in the pipe.

Fig. 3 is a cross-sectional view of a pipe line with my flexible boring head passing therethrough and provided with a boring head.

Fig. 4 is a sectional view taken on the line 4—4 of Fig. 1 showing means for connecting my flexible boring rods.

Fig. 5 is a perspective view of the washer used in attaching my flexible boring rods together.

Fig. 6 is an end elevational view of an attachment for use on my machine for feeding solid boring rods or pipe lines.

Fig. 7 is a sectional view taken on the line 7—7 of Fig. 6.

Fig. 8 is a plan view partly in section of the attachment used on my machine when feeding a flexible boring rod.

Fig. 9 is an end view of the attachment shown in Fig. 8.

Fig. 10 is a perspective view of the cam member used on my machine to operate the clutch which transmits rotation to the boring rod.

Fig. 11 is a side elevational view of the novel boring machine used in progressively feeding and rotating a pipe line or solid boring rod to bore a hole and lay the pipe if desired.

Fig. 12 is an end view of the boring head disposed on the forward end of the pipe line in Fig. 6.

Fig. 13 is a horizontal cross-sectional view through the axis of the shaft of Fig. 6 showing the feeding and rotating means.

Fig. 14 is a cross-sectional view of one of the clutch jaws of the clutch shown in Fig. 13.

Fig. 15 is a view taken on the line 15—15 of Fig. 14.

Fig. 16 is a front elevational view with parts broken away of my novel boring machine with means for locking the machine in a tilted position.

Fig. 17 is a fragmentary view of the locking means of Fig. 16.

Fig. 18 is a view taken on the line 18—18 of Fig. 13.

Fig. 19 is a view taken on the line 19—19 of Fig. 13.

Fig. 20 is a view taken on the line 20—20 of Fig. 1.

Referring to the drawings, the machine shown in Fig. 1 comprises two supporting members 1 connected at their upper ends by a shaft 2 and hand screws 3. A casing 4 having a central aperture 5 (Fig. 13) at substantially right angles to the shaft 2 is formed integral with the shaft 2 and has a supporting member 6 extending thereabove which carries a reversible electric motor 7 and suitable switch means 8. The shaft 9 of the motor 7 carries a pulley 10 which rotates a pulley 11 through a belt 12 whose central axis is in alignment with the aperture 5 of the casing 4. The shaft 2 and the integral casing 4 may be tilted to any position by loosening the hand screws 3.

A hollow shaft 13 (Fig. 13) extends through the aperture 5 in the casing 4 and the front end 14 thereof extends outwardly a sufficient amount in order that a clutching head 15 may be detachably mounted thereon. The clutching head 15 is rotated by the pulley 11 and has disposed therein radially moving jaws 16 (Fig. 20) movable in slots 17 in the head 15. The outer portion of the jaws 16 have recessed portions 18 for receiving one end 19 of bell-cranks 20 pivoted at 21.

The other ends 22 of the bell-cranks 20 have rollers 23 which engage a tapered annular member 24 moved axially by a cam member 25 (Fig. 10). The cam member 25 has rises 26 which contact rollers 27 mounted on the casing 4 when rotated by the handle 28 causing axial movement of the cam member 25 and its adjacent tapered member 24. The roller ends 22 of the bell-cranks 20 are caused to move outwardly upon axial movement of the tapered member 24 thereby causing downward movement of the jaws 16 connected to the ends 19 to engage a boring rod in the form of an open helically wound rod 29. Considerable space is allowed between each turn of the rod 29 in order that it will move forwardly when it contacts a projecting portion in the pipe line or the like in that the projecting portion will project in between two turns and the rotation of the rod will cause it to move forwardly. The rod 29 is preferably made up of a plurality of sections all wound opposite to the direction of rotation of the pointed forward section 37 thereof which is wound in a direction of clockwise rotation in order that it will penetrate a solid mass of material such as a corkscrew enters a cork. The rods 29 are wound opposite to the pointed forward section 37 to provide a stronger boring rod which will be compressed upon torque being applied when the forward section 37 enters a mass of material clogging the pipe line. Upon counter-clockwise rotation of the boring rods 29, they feed themselves, through the means of the open windings thereof contacting projections in the pipe line, to the point where the pipe line is clogged, whereupon the direction of rotation of the rods 29 is changed to a clockwise rotation and the pointed forward section 37 thereof makes contact with the mass of material clogging the pipe line, feeding itself therein like a corkscrew. Spring members 30 (Fig. 18) are utilized to maintain the rollers 23 on the bell cranks 20 in contact with the tapered annular member 24. A sleeve 31 is disposed between the wall of the aperture 5 in casing 4 and the shaft 13. It will be evident that the sections of connected open helically wound rods 29 will move forwardly in the pipe line only the distance that it will stretch when a portion of the rod 29 is held in the jaws 16 of the clutch because the jaws are not movable longitudinally.

When the open helically wound rods 29 are rotated in a reverse direction in the pipe line, they move forwardly a distance of several feet whereupon the jaws 16 are released and the stretched open helically wound rod 29 pulls the whole rod forwardly and the jaws 16 again engage the rod 29 and causes further rotation thereof, and therefore further movement into the pipe line. The open helically wound rods 29 are moved forwardly into the pipe line by hand and it is only when it is required to go around one or more bends that it is necessary to utilize the open helically wound portions of the rods 29 to move the rods 29 forwardly in the pipe line. The pointed forward section 37 on the rod 29 moves forwardly until it completely penetrates through the material clogging the pipe line. The feeding action of the pointed forward section 37 acting as a corkscrew is much greater than the feeding action of the open turns of the helically wound rod 29 through projections in the pipe line. This permits the forward movement of the pointed forward section 37 into a mass of roots or other material clogging the pipe line upon clockwise rotation thereof.

The shaft 2 has two rearwardly projecting arms 32 for supporting a guiding and feeding head 33 (Figs. 8 and 9) comprising a tube 34 having a helically grooved portion 35 formed interiorly thereof made of any suitable material, but which is preferably made of a non-metallic substance such as asbestos with the interior portion thereof of metal or the like. The tube 34 is secured to the guiding and feeding head 35 by suitable screws 36 in axial alignment with the hollow shaft 5 disposed in the casing 4. The internal diameter of the tube 34 is such that the rod 29 can be pushed through the tube 34 without hindrance. When the rod 29 is held by the clutching member's jaws 16 against longitudinal movement, the open turns of the rod 29 are compressed by contact with the helically grooved portion 35 of the tube 34 which feed it forwardly so that when the clutching jaws 16 are released, the rod tends to move forwardly. It will be apparent that the helical grooves in the tube 34 tend to compress the rod 29 only when the rod 29 is rotating in the direction in which the helical turns of the rod 29 and helical grooves in the tube 34 are in the direction which causes compression by engagement. The tube 34 permits the operation of the machine by one man at the forward end thereof because it prevents the snarling of the rod 29 and several sections can be connected together without being thrown outwardly. The tube 34 also silences the noise resulting from the rotation of the rod 29 and further permits the use of this machine in a bathroom or the like in that it is not necessary for the rod 29 to touch the floor because of the tube 34.

As has been stated, the boring rod 29 is an open helically wound rod which has a pointed forward section 37 (Fig. 2) wound in the direction of rotation in order that it will penetrate a solid mass of material such as a corkscrew enters a cork. A boring head 38 (Fig. 3) may be attached to the forward end of one of the sections of the rod 29 and this is usually done after the pointed rod 37 has penetrated the material to be bored. The sections of the rod 29 are held together and the boring head 38 is secured to any of the sections of the rod 29 by providing male and female connecting portions 39 and 40 having apertures 41 and 42 for receiving a spring-urged pin 43 held in place by an open U-shaped washer 44 (Fig. 5). It will be apparent that removal of the washer 44 readily releases the pin 43 and therefore the sections of the rod 29. This provides a connection with no projecting portions which would very materially disrupt the operation of the machine when the projecting portion tried to pass jaws 16 of the clutch head 15.

In operation, the hand screws 3 are loosened to permit the casing 4 and its appendages to be tilted to any desired position. The motor 7 is then started which rotates the clutch head 15 which in turn is freely mounted on the front end of the casing 4. The pointed boring rod 37 as shown in Fig. 2 is started through the guiding and feeding tube 34 and sections of the rod 29 are attached to this rod 37 as needed. The pointed rod 37 and its attached sections is forced into a pipe which is to be cleaned or cleared as far as it will go and then the lever 28 on the cam member 25 is operated to cause the radially moving clutching jaws 16 to grasp the outer periphery of the rod 29 and rotate it in unison with the rotation of the clutching head 15. Any length of rod 29 may be used until the pipe is cleared and the head 38 may be attached to one of the sections of the rod 29 if desired after a penetration of the pointed rod 37. This machine requires a minimum amount of space when in operation.

Instead of the clutching head 15 and the guiding and feeding tube 34 as shown in Fig. 1 which is especially adaptable for boring rods 29 of the open helical type, a clutching head and feeding means may be provided for solid boring rods such as pipes as shown in Fig. 11. Clutching head 15 is of the same construction as the clutching head 15 in Fig. 1 with the exception that wheels 45, preferably with a sharp circumferential surface for grasping pipes or other solid boring rods, are disposed on the radially extending jaws 46. A feeding head 47 (Figs. 6 and 7) is disposed on the two rearwardly extending arms 32 instead of the head 33 of Fig. 1. The feeding head 47 has two parallel arms 48 upon which is slidably mounted a circular member 49 having an internally disposed rotatable bearing 50 and a plurality of grasping members 51 for grasping the boring rod 52, which is a pipe in this case, to move the rotating boring rod 52 forwardly. A lever 53 fulcrumed at 54 on the projecting portion 55 of the feeding head 47 and secured at 56 to the circular member 49 furnishes a leverage in forcing the rotating boring rod 52 forwardly. The grasping members 51 are pivoted at 57 and their toothed portion 58 recedes away from the boring rod 52 in a rearward direction in order that the grasping members 51 may be free to move to the rear after the forward movement of the circular member 49. Spring members 59 urge the grasping members 51 into constant contact with the boring rod 52.

The operation of this modified form of clutch and feeding heads is the same as the previously described machine with the exception that the boring rod 52 may be positively fed by operating the lever 53 to force the circular head 49 with its grasping jaws or members 51 forwardly while in contact with the rotating rod 52. The jaws or members 51 grab when moved forwardly but they permit rearward movement without grabbing.

The use of clutching and feeding heads that permit the use of a solid boring rod may be utilized for laying pipe lines by placing a boring head 60 (Fig. 12) on the front end of the pipe 52 of Fig. 11 and allowing the pipe to remain in place after it has been forwarded a sufficient amount, when the head 60 may be removed, to connect the line to vertically or angularly disposed connections.

Figs. 16 and 17 show a modified form of construction for securing the casing 4 and shaft 2 in a tilted position. A circular slot 62 is formed in a supporting member 1 with an extended portion 63 and a releasable pin member 64 carried by a radially extending arm 65 on the shaft 2 moves in the slot 62 and may be locked in various angled positions by means of a locking key 66. A flexible conduit 67 shown in Fig. 16 provides power for the motor 7. This conduit 67 has the usual conventional plug connections (not shown) for quickly connecting the conduit 67 to a conveniently located power line.

It will be apparent that I have provided a machine which will be of especial use to plumbers and which may be used to lay pipe underground from a cellar or the like without disrupting the surface of the earth except at the extreme end where the connection is to be made. The quickly detachable heads also permit this same machine to be used for clearing and cleaning clogged pipe lines and sewers without disrupting any of the pipe line or sewer or any of its surrounding earth or other surrounding constructions.

Various changes may be made in the specific embodiment of the present invention without departing from the spirit thereof, or within the scope of the appended claims.

What I claim is:

1. In a power driven portable sewer cleaning machine, in combination, adjustable clutching members adapted to grip and rotate open helically wound boring rods, a motor for rotating said clutch members in a forward or a reverse direction, and a comparatively long, flexible guide tube disposed rearwardly of said clutching members having the interior portion thereof helically grooved to engage the open helical turns of said open helically wound boring rod.

2. A power driven portable sewer cleaning machine, in combination, adjustable clutching members adapted to grip and rotate open helically wound boring rods, a motor for rotating said clutch members in a forward or a reverse direction, and a comparatively long, flexible guide tube disposed reawardly of said clutching members having the interior surface thereof helically grooved to engage the open helical turns of said boring rods, the internal diameter of said tube being of greater diameter than the boring rods in order that said boring rods may rotate in the tube in a direction opposite to the helical grooves therein.

KARL J. KOLLMANN.